(12) United States Patent
Boumi

(10) Patent No.: US 10,831,438 B2
(45) Date of Patent: Nov. 10, 2020

(54) MULTI-CHANNEL AUDIO SYSTEM AND METHOD OF USE

(71) Applicant: Eric Thierry Boumi, Minneapolis, MN (US)

(72) Inventor: Eric Thierry Boumi, Minneapolis, MN (US)

( * ) Notice: Subject to any disclaimer, the term of this patent is extended or adjusted under 35 U.S.C. 154(b) by 0 days.

(21) Appl. No.: 16/169,297

(22) Filed: Oct. 24, 2018

(65) Prior Publication Data

US 2020/0133620 A1 Apr. 30, 2020

Related U.S. Application Data

(63) Continuation of application No. 15/985,523, filed on May 21, 2018, now abandoned.

(51) Int. Cl.
*G06F 3/16* (2006.01)
*H04R 3/12* (2006.01)
*H04R 5/04* (2006.01)

(52) U.S. Cl.
CPC .............. *G06F 3/165* (2013.01); *H04R 3/12* (2013.01); *H04R 5/04* (2013.01); *G10H 2210/076* (2013.01); *H04R 2430/01* (2013.01)

(58) Field of Classification Search
CPC .. G06F 3/165; H04R 3/12; H04R 5/04; H04R 2430/01; G10H 2210/076
See application file for complete search history.

(56) References Cited

U.S. PATENT DOCUMENTS

2017/0017461 A1* 1/2017 Tull .................... G06F 3/162
2017/0372697 A1* 12/2017 Cheatham, III ..... H04N 21/439

* cited by examiner

*Primary Examiner* — Andrew L Sniezek
(74) *Attorney, Agent, or Firm* — Johnson and Phung LLC; Thomas N. Phung

(57) ABSTRACT

A multi-channel audio system having a processor, a user interface, a plurality of audio adjustment features, an audio source comprising a plurality of audio channels and a plurality of audio tracks coupled with the audio channels, a stereo, speaker or other audio playback device so that the audio adjustment features allow a user to simultaneously, partially, or individually play the audio channels.

3 Claims, 6 Drawing Sheets

MULTI-CHANNEL AUDIO SYSTEM AND METHOD OF USE

BACKGROUND

1. Field of the Invention

The present invention relates generally to a multi-channel audio system and methods of use. More specifically, the invention is related to a system and method to independently manage and listen to vocals, melodies, and sound effects in the same multi-channel audio file.

2. Description of Related Art

Systems and methods for audio systems and methods of use are well known in the art. For example, stereos and speakers can take in many different media to playback music, songs, and movie audio files. Audio files can be stored on CDs, MP3 players, DVDs and other hardware. Audio files are created by mixing vocals, instrument tracks, and even sound effects. Once the file has been created, it is compressed and streamlined into a single track. This compressed file is usually the only commercially available audio file of the tracks. The track is usually configured for playback as a left track 103 and right track 105 which play the same sound oscillations 111.

One of the problems commonly associated with process 101 is the limited use. For example, users who want to utilize the audio files in karaoke performances cannot use the same track because the vocals and the instrumentation are in a single track. They must purchase a separate and additional track that has the vocals and instrumentation distinct from one another. There are many other cases that a user may wish to separate the audio file and playback only certain tracks.

Although great strides have been made in the area of audio systems and methods of use, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
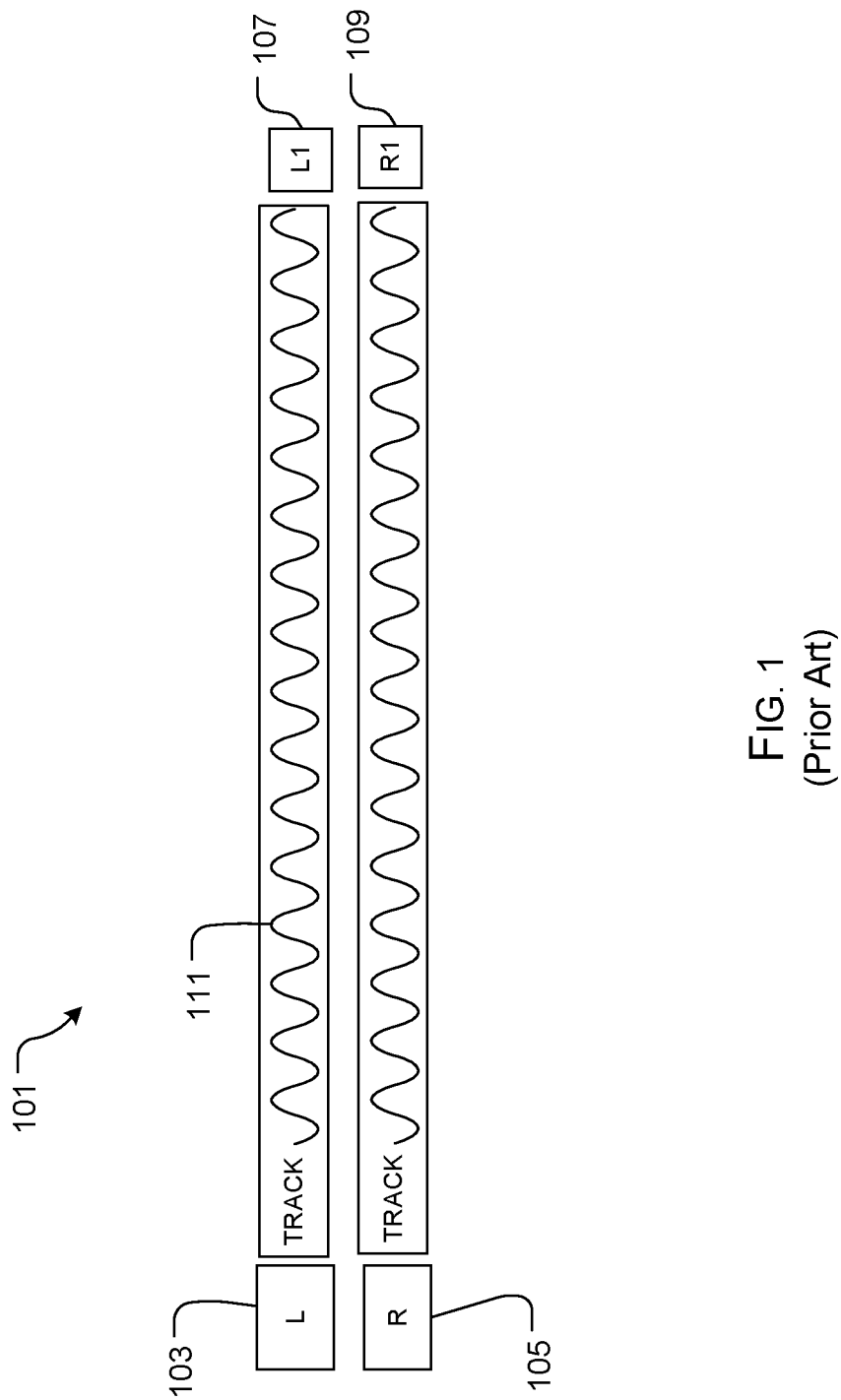
FIG. 1 is a simplified schematic of a conventional audio playback system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional systems and methods of audio playback systems. Specifically, the present invention is directed to a multi-channel audio system that allows the user to independently manage and listen to vocals, melodies and sound effects. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Figure 2:
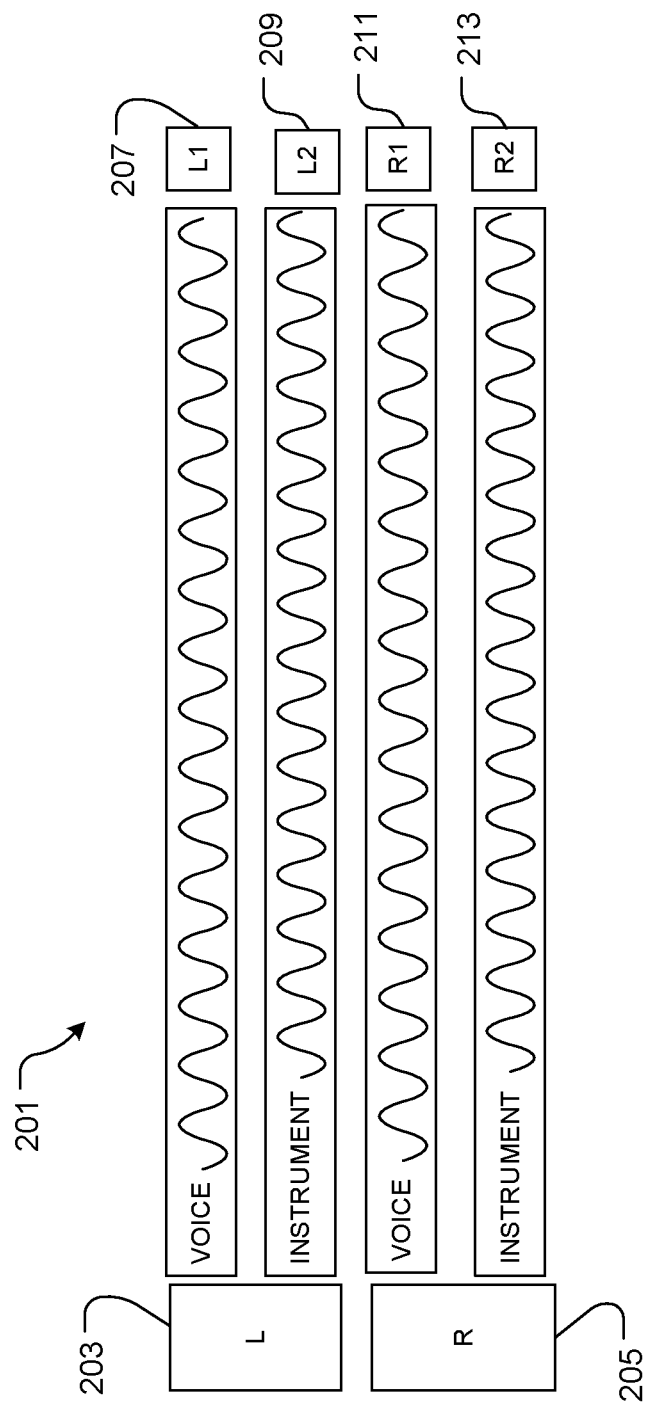
FIG. 2 is a simplified schematic of a system and method of the present invention in accordance with the preferred embodiment of the present invention.
Figure 3:
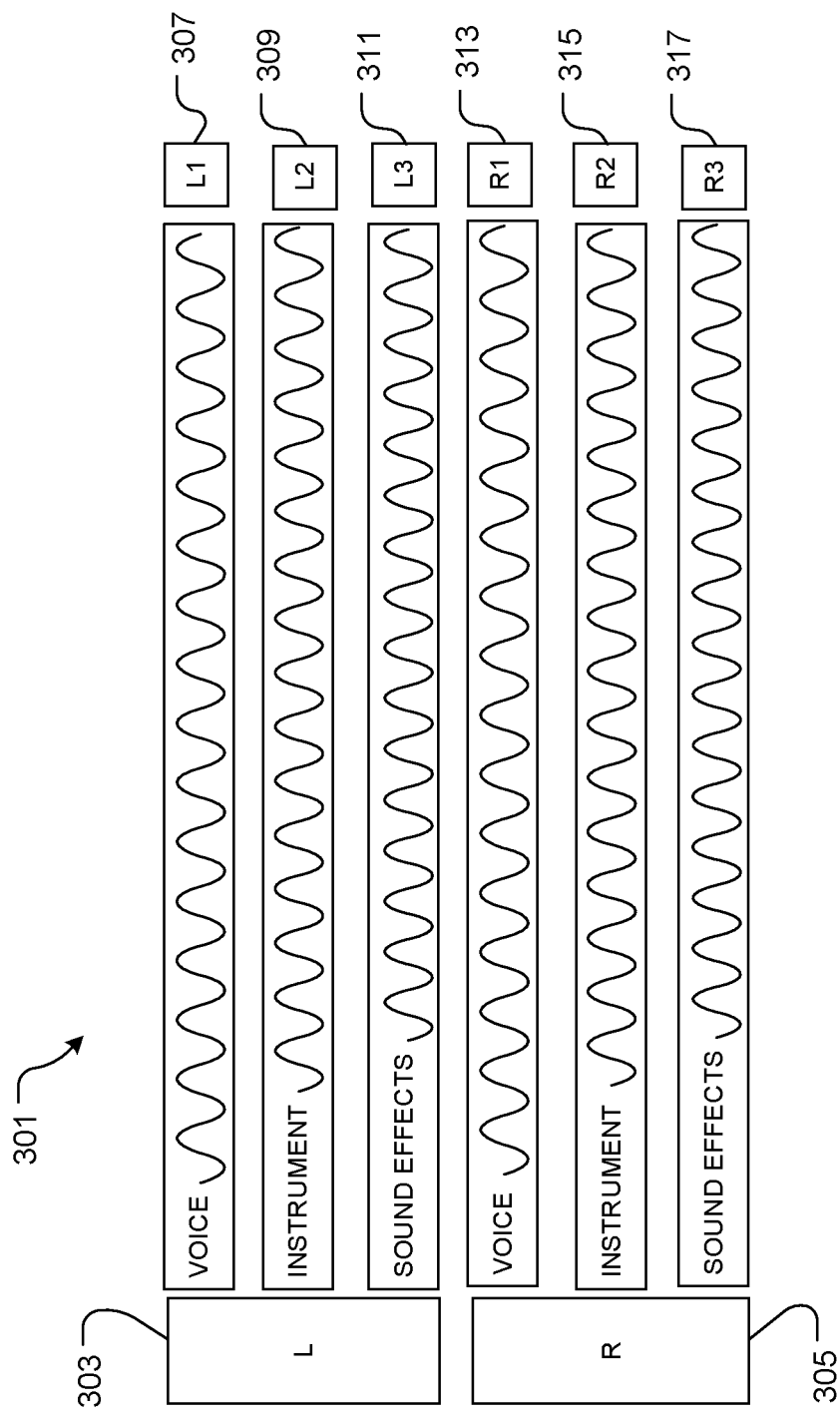
FIG. 3 is an alternate embodiment of the present invention.

Referring now to the drawings wherein like reference characters identify corresponding or similar elements throughout the several views, FIGS. 2-3 depict various views of a system 201 and method of use in accordance with a preferred embodiment of the present application. It will be appreciated that system 201 overcomes one or more of the above-listed problems commonly associated with the conventional systems and methods of audio systems.

In the contemplated embodiment, system 201 is contemplated utilizing a multi-channel audio playback system and multi-channel audio file creator configured to overcome the problems commonly associated with conventional delivering processes.

Referring now to FIG. 2, a simplified schematic of the preferred embodiment of the present invention is shown having four tracks separated into a left oriented track set 203 and a right oriented track set 205. The four tracks consist of a voice track configured as the first left track 207, an instrument track configured as the second left track 209, a voice track configured as the first right track 211, and an instrument track configured as the second right track 213.

Referring now to FIG. 3, a simplified schematic of an alternate embodiment of the present invention is shown having six tracks separated into a left oriented track set 303 and a right oriented track set 305. The six tracks consist of a voice track configured as the first left track 307, an instrument track configured as the second left track 309, a sound effects track configured as the third left track 311, a voice track configured as the first right track 313, an instrument track configured as the second right track 315, and a sound effects track configured as the third right track 317.

Additionally, FIGS. 2-3 may be representative of audio files created by the multi-channel audio file creator. The multi-channel audio files consisting of 4 audio channels for music and 6 audio channels for audiovisual content. The 4 audio channels are structured into 2 separate audio blocks: 1 for vocals (L1-R1) and the second for melodies (L2-R2). The 6 audio channels for audiovisual content are structured into 3 separate audio blocks: 1 for vocals (L1-R1); 1 for melodies (L2-R2) and the third for sound effects (L3-R3).

Figure 4:
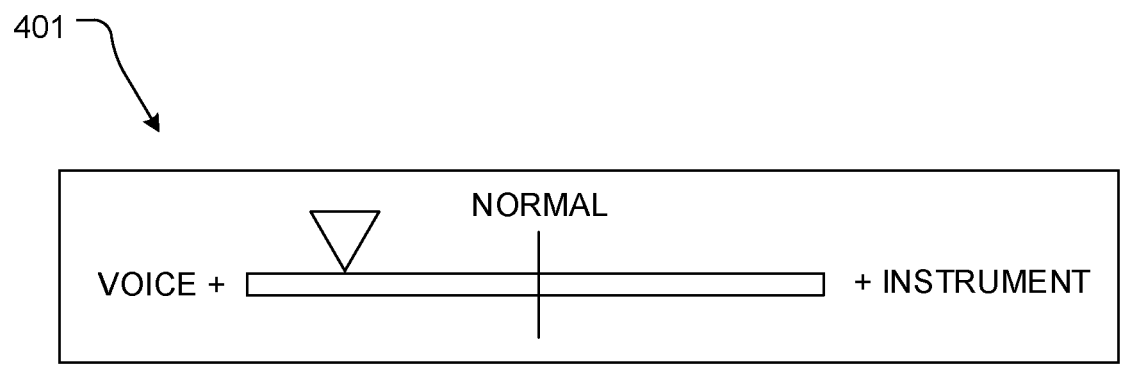
FIGS. 4-6 are front views of different embodiments of adjustment dials as found in the present invention.
Figure 5:
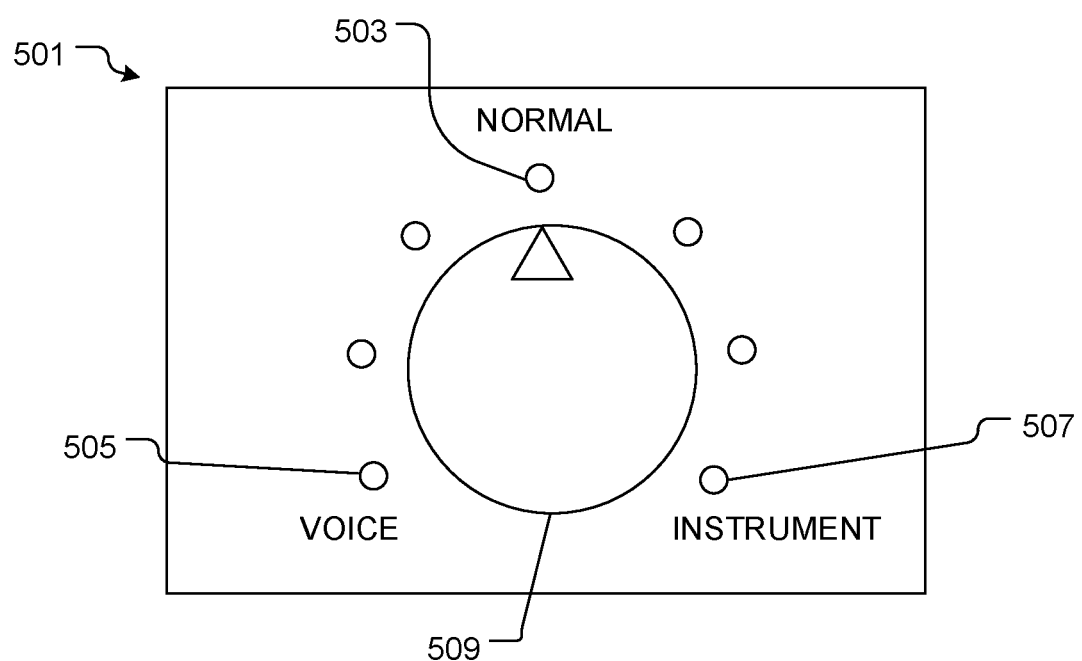
Figure 6:
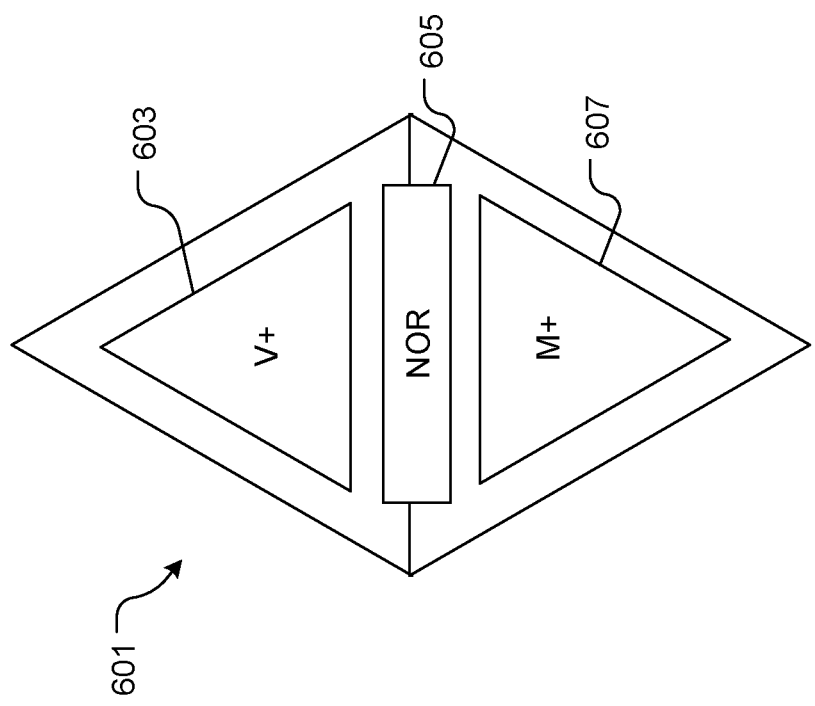
Figure 7:
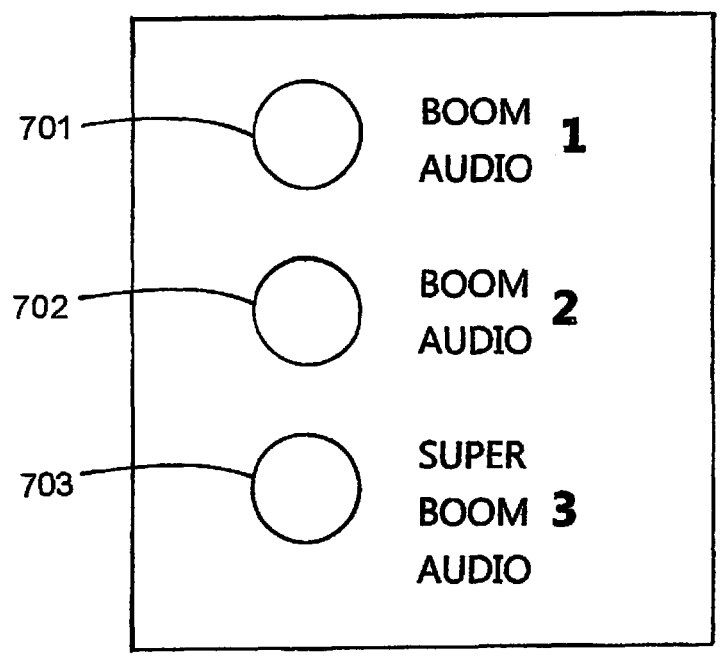
FIG. 7 is a schematic depicting three audio adjustments according to the present invention.

Referring now to FIGS. 4-6, several contemplated embodiments are shown of adjustment features for the audio playback system. These figures are representative of physical dials that comprise a user interface that may be manufactured for the audio playback system. Additionally, these figures are representative of the internal processing and functionality of the audio playback system.

Referring to FIG. 5, the adjustment features for the audio playback system are shown as a dial 509 that is configured to be able to rotate in varying degrees from a voice position 505 to a normal position 503 to an instrument position 507. Each position indicates of which of the tracks of the system of FIG. 2 are to be emphasized during playback. For example, the user may wish to emphasize the vocals tracks or alternatively the instrument tracks. If the user wishes to listen to both the vocals tracks and the instrument tracks, then the dial may be set to the normal position 503.

With these adjustment features, the user can individually adjust the gain and equalizer filters of each of the channels composing the audio file, making it possible to silence the audio source of one channel in order to listen to another in the same direct reading file and vice versa.

Additionally, these adjustment features offer a user specified control function for switching from normal (simultaneous) playback of an audio file to a partial or individual playback; that is, from the playback of one audio channel to another in continuous playback without interruption.

Referring to FIG. 6, the adjustment features for the audio playback system are shown as a set of buttons. If the user wishes to listen to all the tracks together, then the normal position button 605 may be pressed. If the user wishes to emphasize the vocals tracks, the vocals position button 603 may be pressed. If pressed multiple and consecutive times, the vocals track is increasingly emphasized. If the user wishes to emphasize the instrumentation tracks, the instrumentation position button 607 may be pressed in a similar fashion as the vocals position button 603.

In a further contemplated embodiment, the adjustment features are configured as a system and method of transition between vocals and melody channels at the touch of a button. These transition commands are identified by the acronyms V+, No, M+ and SE+ (V+ for Vocals, No for Normal, M+ for Melodies and SE+ for Sound Effects): the V+ control function (Vocals) which adjusts only the vocals' channels (L1-R1); the No (Normal) control function that reinitiates the sound to its normal position, so all channels are played back simultaneously; the M+ (Melodies) to adjust the melodies' channels (L2-R2); the SE+ (Sound Effects) control function, exclusively available for the audiovisual which adjusts the playback of sound effects in movies.

In an alternate contemplated embodiment, the adjustment features further comprise additional audio effects. In one embodiment, the audio effects are referred to as three separate "Boom audio effects." Three Boom audio effects, namely the Boom 1 701 effect of rapidly alternating channels' playback to create original audio effects from which the user determines the transition speed and style between channels; the Boom 2 702 effect that randomly alternates the playback sequences of the different channels to create a special audio effect; and the Boom 3 or Super Boom 703 effect which alternates the playback sequences of the different channels to create an audio effect synchronized to the BPM, which is also commonly known as Beats Per Minute, of the sound being played.

It is contemplated that the adjustment features may be configured as stereo controls that can be retro-fitted to the controllers or remotes of devices such as TV controllers, home stereo system interfaces, etc. In an alternate embodiment, it is contemplated that the parameters of the system settings may also be configured as a numeric format, wherein the numeric format controls could be accessed via a television screen, home stereo or other device.

The multi-channel audio system is configured as a consumer stereo which offers the advantage of simultaneously, partially, or individually playing the audio channels that compose a multi-channel audio file. It is also contemplated that the multi-channel audio system may be configured as a sound management system in a movie, broadcast or other audio-visual streaming. The system is configured to be compatible with many different audio formats, including but not limited to: Mp3, Way, Aiff, Flag, Ogg, etc.

In the contemplated embodiment in which the multi-channel audio system is configured as a sound management system for a broadcast, the present invention is configured to offer a system and method of sound restitution in normal stereo from multichannel sound, enabling lossless listening on all devices and consumer media. The sound is produced on several channels before being played on an L-R stereo output. The calculations and operations of channel management are carried out before the broadcast. The present invention includes a system and method for broadcasting (TV, cable, radio, satellite, streaming, net broadcasting, etc.) that enable a transmitting source to broadcast audio content in the multi-channel audio format and ensure that the receiving party retains all of the technical opportunities offered by the said system.

In the contemplated embodiment in which the multi-channel audio system is configured as a sound management system for a personal-use audio device such as a TV, radio, car stereo, hi-fi, home theater, which system allows the user to adjust the volume of the elements of a multi-channel audio content individually and/or partially.

The multi-channel audio system is configured such that a transition between the various audio channels of voice and melodies composing the multi-channel sound in continuous playback is facilitated. The transition is made gradually by increasing the vocals or the melodies; when the volume of the vocals is increased, that of the melodies decreases and vice versa.

It is contemplated that the multi-channel audio system may be compatible with all electronic devices utilizing stereo speakers including but not limited to: car radios, hi-fi systems, TV, home cinema, DVD/Blu-ray players etc. In a further contemplated embodiment, the multi-channel audio system comprises an application or software housed on a smartphone, tablet or computer that facilitates compatibility with various stereo speakers.

In an alternate embodiment, the multi-channel audio system configured as a stereo or sound management system is coupled with a multi-channel audio file creator. The multi-channel audio file creator is configured as a VST/AAX/RTAS plugin software that is compatible with popular analog and digital recording studio platforms including but not limited to: Cubase, Logic, Pro Tools, etc. The plugin includes a processor which takes individual audio files and mixes them into a multi-channel playback audio file.

The system and method for recording sound in a plurality of independent stereo bands. Each component of the B-Stereo™ file (vocals, melodies and sound effects) is recorded on 2 channels, one of which is L and the other R. The music files will be more often composed of 4 channels (L1-R1 for vocals and L2-R2 for melodies); the soundtracks will more often consist of 6 channels (L1-R1 for vocals, L2-R2 for melodies and L3-R3 for sound effects).

In a further contemplated embodiment, the multi-channel audio file creator is configured to allow identification by genre indexing (vocals, melodies, or sound effects) of audio tracks during audio mixing. This method does not affect the artistic quality of the works. The multi-channel file creator is configured to install markers that require indexing of the various audio sources to be mixed in order to identify genres.

The present invention in any of its contemplated embodiments is a multi-channel audio system that enhances the way people listen to music. It is possible for the general consumer to listen to different parts of a song, adjust the sound effects in a film, or isolate the instrumentation of a song track by voluntarily stopping the vocals. This offers the advantage of a longer lifetime to songs because the multi-channel audio system allows the user to selectively listen to and discover different components of a song or other audio file by separating the melodies and the vocals, thus giving the user the opportunity to appreciate the artistic talents of beatmakers and mix engineers in more meaningful way.

The multi-channel audio system allows karaoke enthusiasts to practice with A Capella vocals available by pressing a single key. Therefore, the release of a CD album utilizing the present invention also gives the album a longer lifespan because users can enjoy the song tracks in the many ways discussed above.

In one contemplated embodiment, the present invention allows simultaneous playback of several distinct audio elements and enabling the partial or individual playback of the separate audio elements in the same audio file. Standard elements that may be separated include vocals, melody (instrumentation), and sound effects. In a further contemplated embodiment, the melody or instrumentation could be further segmented or separated into separate instrument channels. For example, if a melody includes a piano, guitar and drums instrumentation, the user could choose to listen to each instrument separately and manipulate transitions and volume of each instrument.

The multi-channel audio system offers the volume management option and control of vocals, melodies, and/or sound effects independently of each other in a song or in a video played from a CD, DVD, Blu-ray disk, flashdrive, smartphone, tablet, computers, analog players, car radios, stereo system or DJ decks.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A multi-channel audio system comprising:
    a user interface;
    a plurality of audio adjustment features, the audio adjustment features having:
        a first audio effect configured to rapidly alternate between audio channels to create original audio effects from which the user determines the transition speed and style between audio channels;
        a second audio effect configured to randomly alternate playback sequences of the audio channels; and
        a third audio effect configured to alternate playback sequences of individual audio channels to create an audio effect that synchronized to the BPM (Beats Per Minute) of an audio source being played;
    an audio source comprising a plurality of audio channels and a plurality of audio tracks coupled with the audio channels;
    an audio playback device configured to project sound from the plurality of audio channels;
    wherein a user may control the audio adjustment features via the user interface; and
    wherein the audio adjustment features are configured to allow a user to simultaneously, partially, or individually play the audio channels.

2. The multi-channel audio system of claim 1, wherein the audio adjustment features are configured as a software application compatible with smartphones, tablets or computers.

3. The multi-channel audio system of claim 1, further comprising:
    a multi-channel sound management system configured to manage playback of audio files found in a movie, broadcast or other streaming.

* * * * *